Nov. 7, 1933.   J. L. BURKEY   1,933,786
ANIMAL YOKE
Filed Oct. 18, 1932
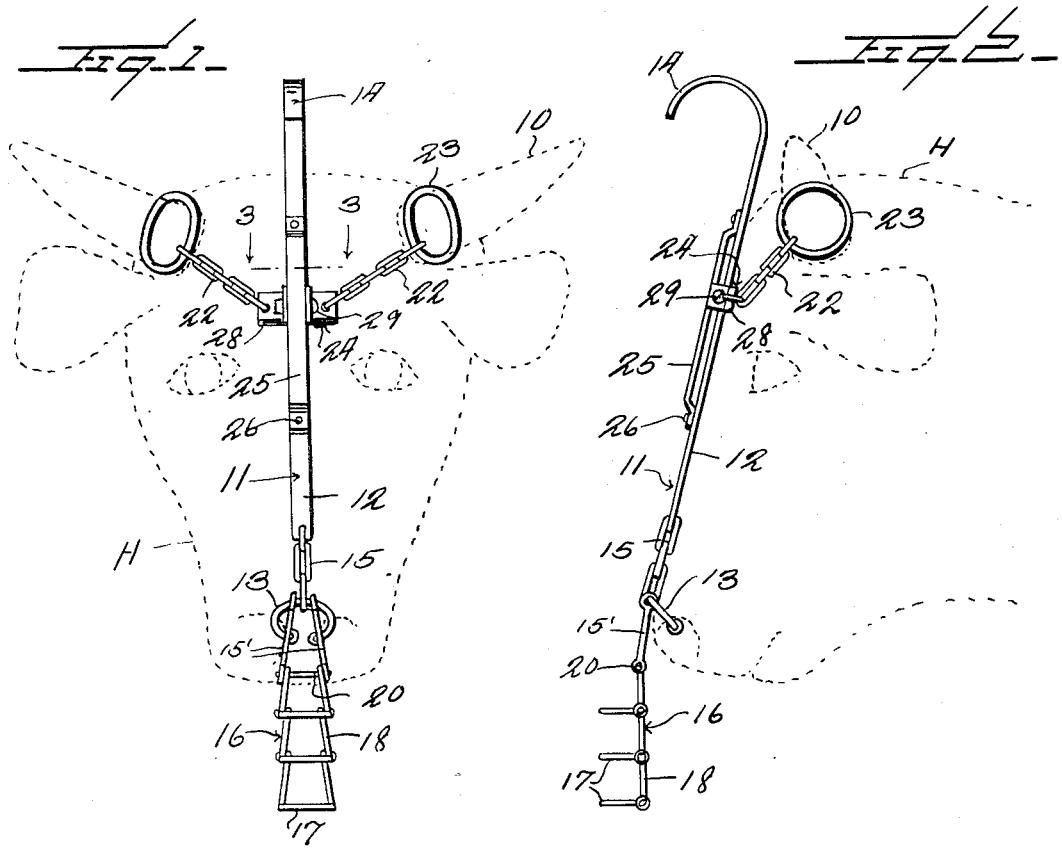
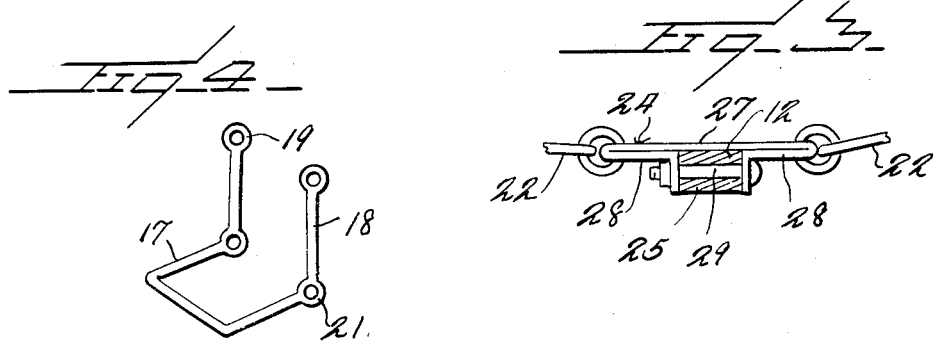
Inventor
J. L. Burkey
By Watson E. Coleman
Attorney Patented Nov. 7, 1933

1,933,786

UNITED STATES PATENT OFFICE 1,933,786

ANIMAL YOKE

John L. Burkey, Hazelton, Kans.

Application October 18, 1932. Serial No. 638,365

4 Claims. (Cl. 119—142)

This invention relates to animal yokes and more particularly to a yoke adapted to be mounted on the head of an animal so as to prevent the animal from going over the top of a fence or attempting to go between portions of the fence.

An object of this invention is to provide a device which is particularly designed for mounting on unmanageable animals which will not interfere with the grazing or eating of the animal, but will prevent the animal from going through a fence or over the top of the fence or enclosure.

Another object of this invention is to provide a device of this kind which can be readily and easily mounted on the head of the animal in a position whereby it will not annoy or injure the animal while it is being worn.

The above and various other objects and advantages of this invention will in part be described and in part be understood from the following detailed description of the present preferred embodiment, the same being illustrated in the accompanying drawing wherein:—

Figure 1 is a detail front elevation of a device constructed according to the preferred embodiment of this invention, showing the device mounted on the head of an animal which is shown in dotted lines.

Figure 2 is a detail side elevation of the device.

Figure 3 is an enlarged fragmentary sectional view taken on the line 3—3 of Figure 1.

Figure 4 is a detail perspective view of one of the lower fence engaging members.

Referring to the drawing wherein like characters of reference designate corresponding parts throughout the several views, the letter H designates generally the head of an animal which, in the present instance, is disclosed as being a bull which has horns 10 projecting laterally therefrom.

In order to provide means whereby an unmanageable animal of this type can be maintained in an enclosure but at the same time permitted to have free run about the enclosure, I have provided a frame structure, generally designated as 11, which is disposed on the face of the head H, and is mounted in a vertical position.

This frame H comprises an elongated bar 12 which is provided at the upper end thereof with a forwardly extending hook 14, and the lower end of this bar 12 is secured to the nose ring 13 by means of links or chain members 15. The nose ring 13 is passed through one of the links 15 of the chain and is so positioned that upward movement of the bar 12 by engagement of the hook 14 with a fence rail or wire will cause the nose ring 13 to be placed under tension or strain.

A plurality of L-shaped fence engaging members, generally designated as 16, are dependingly supported from the links 15' below the nose ring 13, and these fence engaging members 16 are constructed in the form of a U-shaped member 17 to the parallel legs of which are secured vertically extending arms or bars 18. The bars 18 have eyes 19 at the upper ends thereof to receive a horizontally extending bolt or headed member 20 and the fence engaging members 16 are also provided with an eye 21 at the junction between the parallel legs of the U-shaped member 17 and the vertical bars 18.

In this manner, a number of these fence engaging members which are L-shaped in side elevation can be dependingly supported from the links 15' so that they will catch or engage the top strands or bars of a fence and pull the nose ring 13 downwardly and thereby prevent the animal from going over the top of the fence.

In order to support the yoke herein disclosed on the head of the animal, I have provided a pair of chains 22, each of which is provided with a ring or eye 23 engaging about the horns 10, and the inner ends of these chains 22 are attached to an adjustable slide member 24 which is mounted on the bar 12. This bar 12 is provided with a guide bar 25, which is offset forwardly from the body of the bar 12 and secured at each end by means of bolts or rivets 26 so that the body of this guide member 25 will be disposed in parallel relation to the bar 12. The slide 24 is constructed in the form of a plate 27 which is reverted at each end and bent in the form of an L, as at 28, so that one leg of this L-member 28 will engage the back bar 27, and the other leg of the L will engage the sides of the bar 12 and the guide bar 25.

A bolt or tightening member 29 connects the opposing legs of the L-members 28 and extends in the space between the bar 12 and the guide bar 25. This slide 24 is adapted to be so adjusted that the chains 22 will comfortably support the yoke 11 on the face of the animal and prevent undue strain on the nose ring 13 while the animal is grazing about the enclosure.

The slide 24 may also be so adjusted that when undue strain is applied to the swinging fence engaging members 16, this slide will slip sufficiently so that the force or strain applied to these members 16 will permit the bar 12 to move downwardly, and thereby pull the nose ring 13 in a downward direction to prevent the animal from going over the top of the fence. In this manner, the slide 24 with the chains 22 can normally hold the yoke 11 in a comfortable position, but when undue strain either at the top or the bottom of this yoke is applied, this strain or pressure will be communicated to the nose ring 13, and the animal thus prevented from going either over the fence or through the strands or bars of the fence.

While I have shown the yoke 11 supported by the chain members 22, I do not wish to be limited to this particular construction inasmuch as where the animal does not have horns, the yoke 11 can be readily secured by means of the chain members 22 to the halter or other strap mounted about the head of the animal.

In the use of this device, the chains 22 are attached by means of the rings 23, to the horns of the animal and the slide adjusted between the guide bar 25 and the base bar 12, the chain 15 is attached to the nose ring 13, and the slide 24 then adjusted so that the chains 22 will comfortably support the bar 12 so that no weight of the yoke will be borne by the ring 13. As many swinging fence engaging members 16 may be attached to the ring 13 as may be desired, but preferably a relatively small number of these L-shaped members 16 are mounted on the ring 13 so that the animal can readily and easily graze, drink or the like without becoming annoyed by the yoke.

As shown in the drawing, there are two of the links 15' which dependingly support the members 16 from the ring 13, and these links 15' keep the members 16 from turning or twisting so that they will be in operative position at all times. The hook 14 not only prevents the animal from going through the bars of the fence but also prevents the animal from going beneath the fence.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. The combination with a nose ring, of a yoke, a slide, means for mounting the slide on the head of an animal, frictional means for mounting the slide on the yoke whereby the yoke can have movement relative to the slide when under undue strain, means connecting the yoke with the ring, and means dependingly carried by the ring whereby the ring and yoke will be placed under undue strain upon contact of said latter means with a fence construction accompanied by upward movement of the head of the animal.

2. An animal yoke comprising an elongated bar having a forwardly extending upper end portion, a guide carried by the bar, a slide engaging the guide and the bar, means for normally maintaining the slide in a predetermined position relative to the guide and the bar, means for mounting the slide on the head of an animal whereby to dispose the bar in a vertical position, an L-shaped fence engaging member, and means for connecting the latter member to the bar whereby the latter member may have swinging movement relative to the head of an animal.

3. An animal yoke comprising an elongated bar having a forwardly extending upper end portion, a second bar mounted on the elongated bar, a slide engaged between the two bars, means for normally maintaining the slide in a predetermined position relative to said bars, and means for mounting the bars in a vertical position on the head of an animal.

4. An animal yoke comprising an elongated bar having a forwardly extending upper end portion, a guide carried by the bar, a slide engaging the guide and the bar, means for normally maintaining the slide in a predetermined position relative to the guide and the bar, a ring mounted on the bar, an L-shaped fence engaging member connected to the ring whereby the latter member may have swinging movement relative to the head of an animal.

JOHN L. BURKEY.